United States Patent
Patel et al.

[11] Patent Number: 5,907,471
[45] Date of Patent: May 25, 1999

[54] ENERGY STORAGE DEVICE WITH ELECTROMAGNETIC INTERFERENCE SHIELD

[75] Inventors: Hitendra K. Patel, Palatine; Craig E. Rupp, Wauconda; John C. Byrne, Palatine, all of Ill.

[73] Assignee: Motorola, Inc., Schaumburg, Ill.

[21] Appl. No.: 08/999,505

[22] Filed: Dec. 29, 1997

[51] Int. Cl.[6] .............................. H01G 9/00; H01G 2/10; B65D 51/00; H05K 9/00
[52] U.S. Cl. ...................... 361/500; 361/517; 361/519; 361/535; 174/35 R; 429/163; 429/168
[58] Field of Search ...................... 361/500, 502, 361/503, 508, 511, 512, 504, 514, 516, 517–519, 523, 525, 528, 530, 532, 535–537, 212, 816, 818; 174/35 R, 35 GC; 429/96–100, 10, 175, 176, 177, 185, 163, 166, 168, 188

[56] References Cited

U.S. PATENT DOCUMENTS

| | | | |
|---|---|---|---|
| 4,737,889 | 4/1988 | Nishino et al. | 361/502 |
| 5,071,720 | 12/1991 | Notten | 429/101 |
| 5,115,378 | 5/1992 | Tsuchiya et al. | 361/502 |
| 5,227,960 | 7/1993 | Kunishi et al. | 361/502 |
| 5,621,607 | 4/1997 | Farahmandi et al. | 361/502 |

*Primary Examiner*—Kristine Kincaid
*Assistant Examiner*—Anthony Dinkins
*Attorney, Agent, or Firm*—Felipe J. Farley

[57] ABSTRACT

An energy storage assembly is made of an energy storage device, and electromagnetic interference (EMI) shield, and an adhesive positioned between the EMI shield and the energy storage device for affixing the energy storage device to a surface of the EMI shield. The EMI shield is a metal that is shaped to partially enclose an electrical component other than the energy storage device.

12 Claims, 2 Drawing Sheets

ENERGY STORAGE DEVICE WITH ELECTROMAGNETIC INTERFERENCE SHIELD

TECHNICAL FIELD

This invention relates in general to energy storage devices, and more specifically to batteries or capacitors that are used in devices exposed to electromagnetic interference (EMI).

BACKGROUND

Radio communication devices, such as two-way radios and cellular telephones, usually include a power amplifier that can be set to a gain on the order of 20 decibels (dB). Additionally, transmitted signals can have power levels of up to 20 Watts (W). Energy often leaks back into the power amplifier input, which results in regeneration. Another common problem in radio communication devices is that the power dissipated by an energy storage device, such as a capacitor, coupled to the power amplifier can be as large as 0.2 W, which increases the temperature, and therefore reduces the useful life, of the radio device. Devices such as electromagnetic interference (EMI) shield and heat sinks can be used to minimize these problems, but space constraints within small, portable radio devices make this solution difficult.

Thus, what is needed is a space-efficient way of dealing with regeneration and heat generation within radio communication devices.

DETAILED DESCRIPTION OF THE PREFERRED EMBODIMENT

Figure 1:
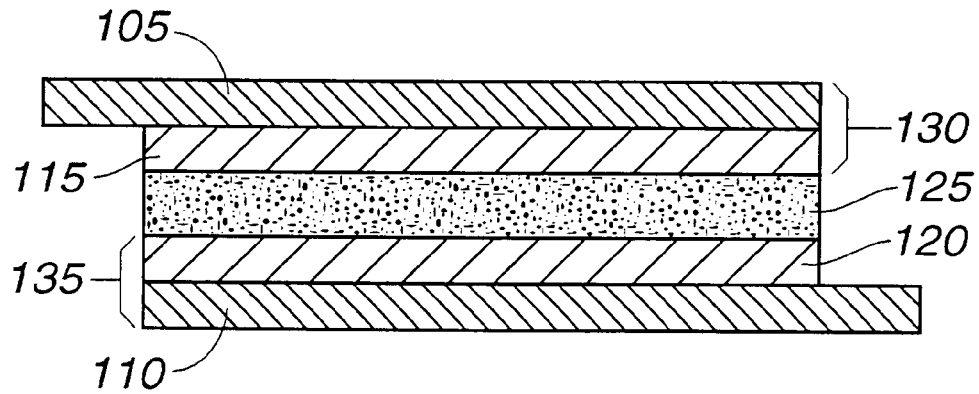
FIG. 1 is a side view of a conventional energy storage device.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, a side view of a conventional energy storage device 100 is shown. The energy storage device 100 can be, for instance, a battery cell or a capacitor, such as an electrochemical capacitor. The energy storage device 100 comprises a first substrate 105 that is electrically conductive, an electroactive material 115 disposed on an inner surface of the substrate 105, a second substrate 110 that is electrically conductive, and another layer of electroactive material 120 disposed on an inner surface of the substrate 110. A layer of electrolyte material 125 is positioned between the two electroactive material layers 115, 120 to complete formation of the energy storage device 100. Together, the substrate 105 and the electroactive material 115 coated thereon form a first electrode 130 of the device, and the substrate 110 and the electroactive material 120 form a second electrode 135. It will be appreciated that the energy storage device 100 can be a multiple The substrates 105, 110, the electrolyte 125, and the electroactive materials 115, 120 can be manufactured from materials that are typically used for forming capacitors or batteries, whichever the case may be. By way of example, when the energy storage device 100 is a capacitor, the processes and materials used to construct device 100 can be, for instance, those disclosed in commonly assigned U.S. Pat. No. 5,568,353 issued Oct. 22, 1996 to Bai et al., entitled "ELECTROCHEMICAL CAPACITOR AND METHOD OF MAKING SAME", the teachings of which are hereby incorporated by reference. It will also be appreciated that the energy storage device 100 could be a multiple cell device rather than the single cell that is shown. In other words, a plurality of electrode-electrolyte-electrode combinations could be stacked and connected in series or parallel to increase device performance.

The planar energy storage device 100 can, alone, require a relatively large amount of surface area for mounting within an electronic device. However, in smaller, lighter weight devices such as portable radio communication devices, space is at a premium. Therefore, traditional placement and mounting methods may not be feasible in portable applications.

In accordance with the present invention, an energy storage device, such as the energy storage device 100, can be mounted in a novel configuration that requires little or no additional space within an electronic device. In particular, an advantage of the present invention is that space traditionally used for mounting of another component, such as an electromagnetic interference (EMI) shield, can be shared with the device 100, as will be described in greater detail below.

Figure 2:
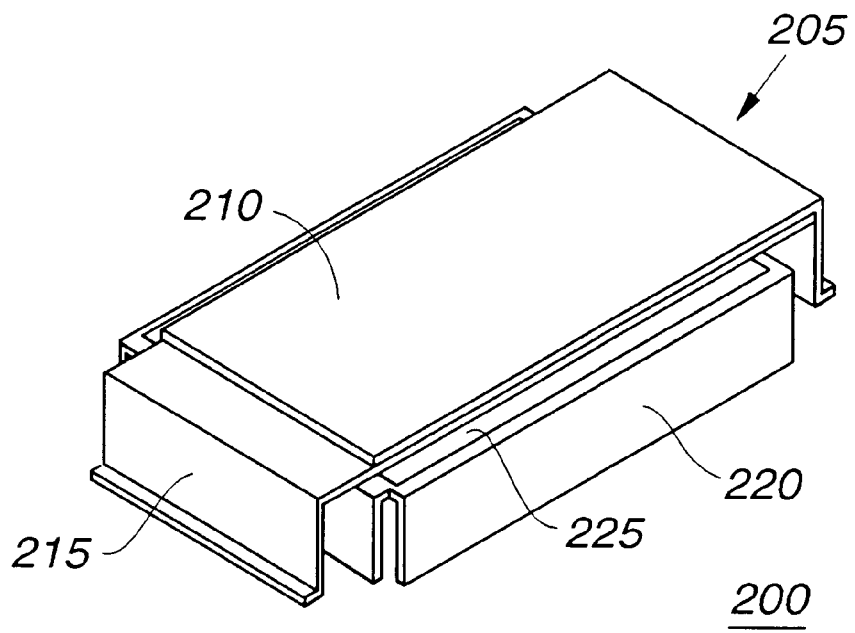
FIG. 2 is a perspective view of a energy storage/EMI shielding device in accordance with the present invention.

Referring next to FIG. 2, a perspective view of an energy storage assembly 200 is shown. The energy storage assembly 200 comprises an energy storage device 205 as well as an electrically conductive member 220. The energy storage device 205, as mentioned above, can be a capacitor, such as an electrochemical capacitor, or a battery. The electrically conductive member 220 is preferably formed as an EMI shield 220 for shielding an electrical component within an electronic device. The EMI shield 220 can be configured in a conventional form factor. In other words, the EMI shield 220 can comprise a metallic material that has a planar, top surface and two or three side surfaces that are substantially perpendicular to the top surface.

The energy storage device 200 includes the substrates, electroactive material, and electrolyte typically included in energy storage devices. The positive and negative substrates 210, 215, which are electrically conductive, can also serve as positive and negative leads of the device 205. According to the present invention, the positive and negative substrates 210, 215 are bent so that the device 200 can be placed directly over the EMI shield 220, in which configuration the energy storage device 200 can be mounted and electrically coupled to a printed circuit board (not shown) or other substrate. Preferably, the energy storage assembly 200 further comprises an adhesive 225 between the top surface of the EMI shield 220 and a bottom surface of the energy storage device 205 so that the device 205 can be securely affixed to the EMI shield 220. In this manner, the device 205 requires no additional surface area for mounting within an electronic device. Additionally, the metal of the EMI shield 220 serves as a heat sink for the energy storage device 205, which eliminates the requirement for a separate heat sink device.

As mentioned briefly hereinabove in the Background of the Invention, EMI shields are often used to partially enclose power amplifiers included within radio communication devices. Furthermore, capacitors are generally used to power the power amplifier. Therefore, the energy storage assembly 200 according to the present invention is uniquely suited for use in electronic devices that include a power amplifier. More specifically, in an electronic device that utilizes a power amplifier, the assembly 200 can be conveniently used to shield the power amplifier from electromagnetic interference while locating a capacitor 205 within close proximity to the power amplifier, thereby minimizing the electrical interconnect resistance between the capacitor 205 and the power amplifier.

Figure 3:
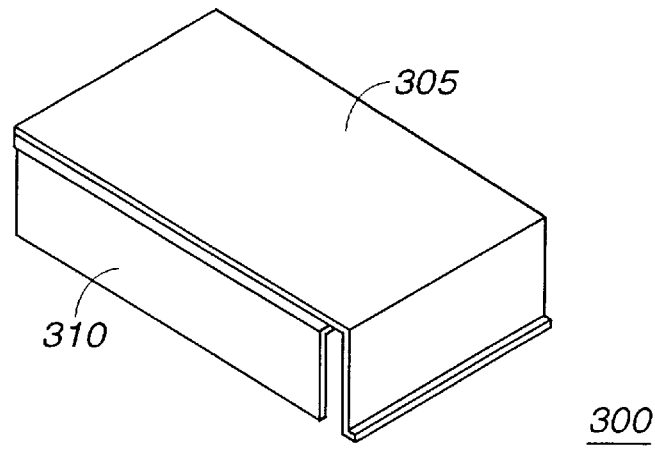
FIG. 3 is a perspective view of another energy storage/EMI shielding device in accordance with the present invention.
Figure 4:
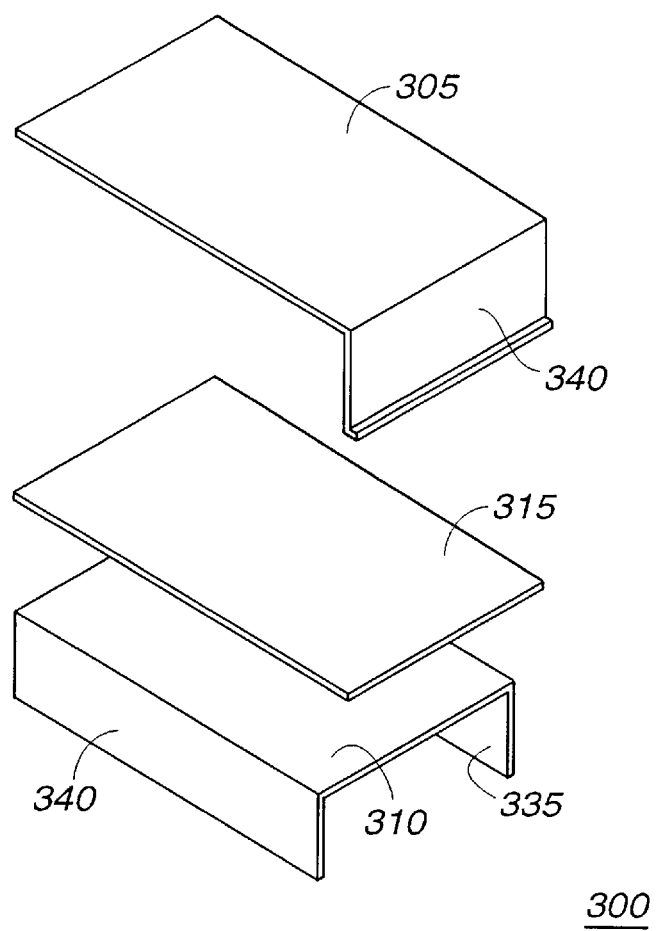
FIG. 4 is an exploded view of the energy storage/EMI shielding device of FIG. 3 in accordance with the present invention.

FIGS. 3 and 4 illustrate another embodiment of the present invention in which additional metallic members for an EMI shield are unnecessary. According to this embodiment, a planar, stacked energy storage device 300 includes a first substrate 310 having opposite ends thereof bent to form opposing side surfaces 330, 335. An electrolyte system 315 is disposed on top of the first substrate 310. A second substrate 305 is positioned on top of the electrolyte system 315 to complete formation of the energy storage device/assembly 300. The second substrate includes a top, planar surface as well as at least one end that is bent to form a side surface 340. When assembled (FIG. 3), the device 300 can be placed over the top of an electrical component, such as a power amplifier, to serve as an EMI shield. It will be appreciated, however, that care should be taken to avoid electrical contact between portions of the first substrate 310 and portions of the second substrate 305. This could be done, for instance, by placing insulators (not shown) between the various side surfaces or by ensuring that the side surfaces are not in direct mechanical contact.

In summary, the energy storage assembly as described above provides energy storage functions and EMI shielding functions within a very small amount of space. As a result, the assembly can be easily and conveniently fit within electronic devices that have tight space constraints.

What is claimed is:

1. An energy storage assembly, comprising:
   an energy storage device;
   an electromagnetic interference (EMI) shield; and
   an adhesive positioned between the EMI shield and the energy storage device for affixing the energy storage device to a surface of the EMI shield wherein the EMI shield comprises a metal that partially encloses an electrical component other than the energy storage device.

2. The energy storage assembly of claim 1, wherein the energy storage device is a capacitor.

3. The energy storage assembly of claim 1, wherein the energy storage device is a battery.

4. The energy storage assembly of claim 1, wherein the EMI shield comprises an electrically conductive material.

5. The energy storage assembly of claim 4, wherein the EMI shield comprises a top surface and at least two side surfaces that are substantially perpendicular to the top surface, and wherein the adhesive is positioned between the top surface and the energy storage device.

6. The energy storage assembly of claim 4, wherein the energy storage device comprises first and second electrodes and an electrolyte positioned therebetween.

7. An energy storage assembly, comprising:
   a first substrate that is electrically conductive and that includes a planar surface and a side surface perpendicular to the planar surface;
   a second substrate that is electrically conductive and that includes a planar surface and side surfaces that are perpendicular to the planar surface; and
   an electrolyte positioned between and contacting the first and second substrates,
   wherein the first and second substrates and the electrolyte form an energy storage device and the first and second substrates form an electromagnetic interference (EMI) shield,
   wherein the EMI shield partially encloses an electrical component other than the energy storage device.

8. The energy storage assembly of claim 7, wherein the energy storage device is a capacitor.

9. The energy storage assembly of claim 7, wherein the energy storage device is a battery.

10. The energy storage assembly of claim 9, wherein the first and second electrodes are opposite in polarity.

11. The energy storage assembly of claim 7, wherein the first substrate comprises a first electrode of the energy storage device, and wherein the second substrate comprises a second electrode of the energy storage device.

12. The energy storage assembly of claim 11, wherein the first substrate is electrically insulated from the second substrate.

* * * * *